United States Patent [19]
Lin

[11] Patent Number: 5,164,857
[45] Date of Patent: Nov. 17, 1992

[54] WIDE BAND NON-COATED BEAM SPLITTER

[75] Inventor: Warren W. Lin, Fremont, Calif.

[73] Assignee: Nanometrics, Incorporated, Sunnyvale, Calif.

[21] Appl. No.: 719,509

[22] Filed: Jun. 24, 1991

[51] Int. Cl.[5] .............................. G02B 27/14
[52] U.S. Cl. .................... 359/583; 359/350; 359/580; 359/639; 359/629
[58] Field of Search ............ 359/580, 581, 582, 583, 359/589, 629, 639, 633, 350

[56] References Cited

U.S. PATENT DOCUMENTS

| | | | |
|---|---|---|---|
| 4,627,688 | 12/1986 | Kobayashi et al. | 359/639 |
| 4,632,553 | 12/1986 | Vidrine et al. | 359/350 |
| 4,765,715 | 8/1988 | Matsudaira et al. | 359/583 |

Primary Examiner—Janice A. Howell
Assistant Examiner—Kim-Kwok Chu
Attorney, Agent, or Firm—Linval B. Castle

[57] ABSTRACT

A very wide band beam splitter for operation in the range between deep ultraviolet of 190 nanometers and into infrared is comprised of uncoated transparent material only 0.10 to 0.15 mm. in thickness.

6 Claims, 2 Drawing Sheets

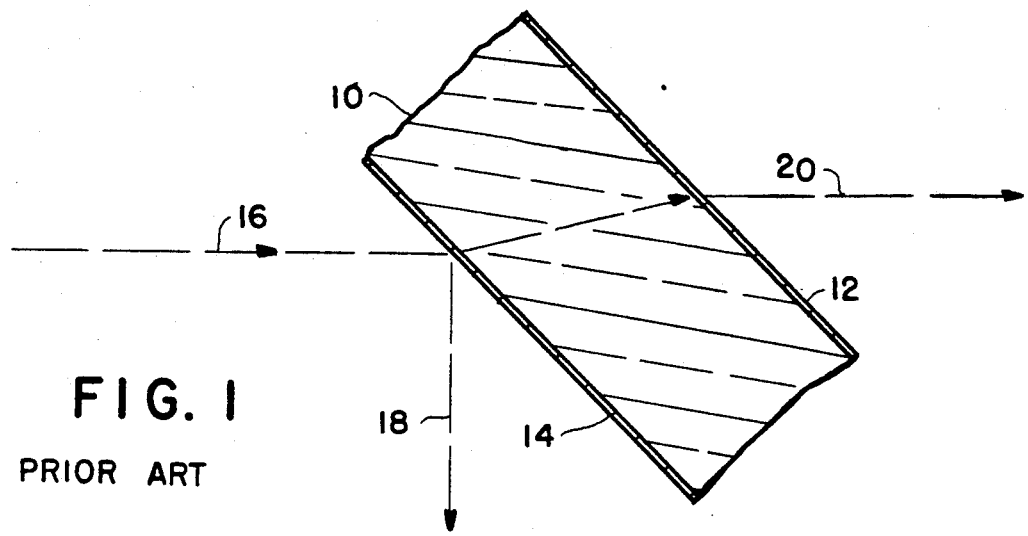
FIG. 1
PRIOR ART
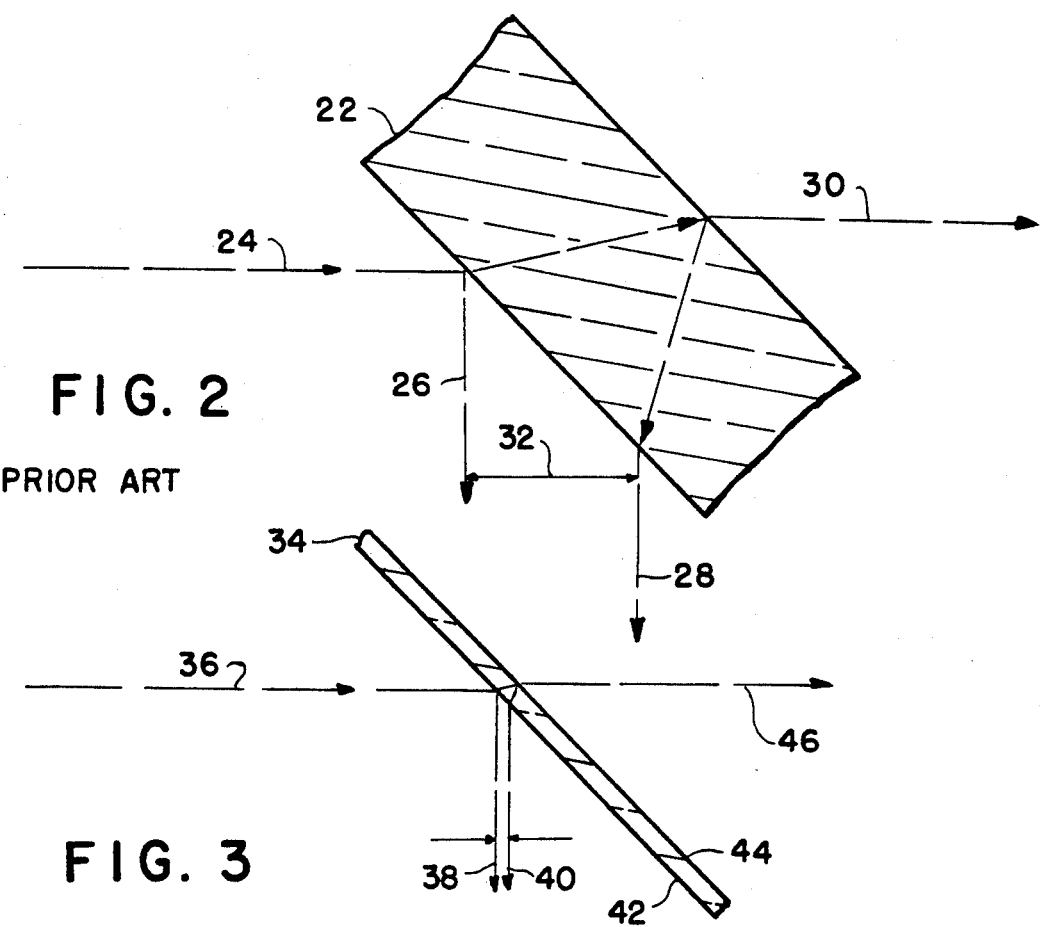
FIG. 2
PRIOR ART
FIG. 3

5,164,857

WIDE BAND NON-COATED BEAM SPLITTER

BRIEF SUMMARY OF THE INVENTION

This invention relates to optical elements and in particular to a beam splitter for reflecting a beam that may lie in the ultraviolet, visual, and into the infrared spectrum.

In the science of optics, a beam splitter is a partial mirror that reflects a portion and transmits a portion of an optical beam falling upon it. Virtually all beam splitters are used in the visible spectrum. The construction of such a beam splitter involves the application of an anti-reflecting coating on one surface and a partially-reflecting coating to the other surface of a transparent plate approximately one millimeter in thickness. Beam splitters of this type can easily be constructed to reflect or transmit predetermined amounts of the impinging optical beam and function very adequately in the visible spectrum for which they were designed.

Optical science has recently been expanding from the visible spectrum into the infrared and particularly the ultraviolet ranges in the development of microspectrometers and other highly specialized instruments. In these non-visible areas, the above described beam splitters cannot properly function because the partially reflective and anti-reflective coatings used for a beam splitter in the visible range appear opaque to wavelengths below about 300 nanometers (nm.), and cannot cover a wide range of 190 nm. to 900 nm. Thus, the coatings applied on the conventional visible range beam splitters operate to prevent normal use in the infrared and ultraviolet ranges.

It is usually not practical to eliminate the anti-reflecting and partially reflective coatings from the surfaces of a 1 millimeter thick transparent plate to thus make it usable in the ultraviolet spectrum because a double reflection of the impinging beam from both front and rear surfaces of the plate results.

The wide band beam splitter to be described and claimed herein is an uncoated transparent plate such as fused silica or sapphire, less than 0.15 mm. in thickness and is useful in the range from deep ultraviolet of about 190 nm. well into the infrared end of about 900 nm. the spectrum. A single narrow impinging beam is reflected from the beam splitter as a double, but extremely closely spaced, reflected beam because of the thinness of the transparent plate.

BRIEF DESCRIPTION OF THE DRAWINGS

In the drawings which illustrate the preferred embodiment of the invention:

FIG. 1 is an enlarged sectional view illustrating a prior art beam splitter with transmitted and reflected optical beams;

FIG. 2 is an enlarged sectional view illustrating a prior art beam splitter without anti-reflecting and partial reflective coatings;

FIG. 3 is an enlarged sectional view illustrating the beam splitter of the invention.

DETAILED DESCRIPTION OF THE PREFERRED EMBODIMENT

Figure 4:
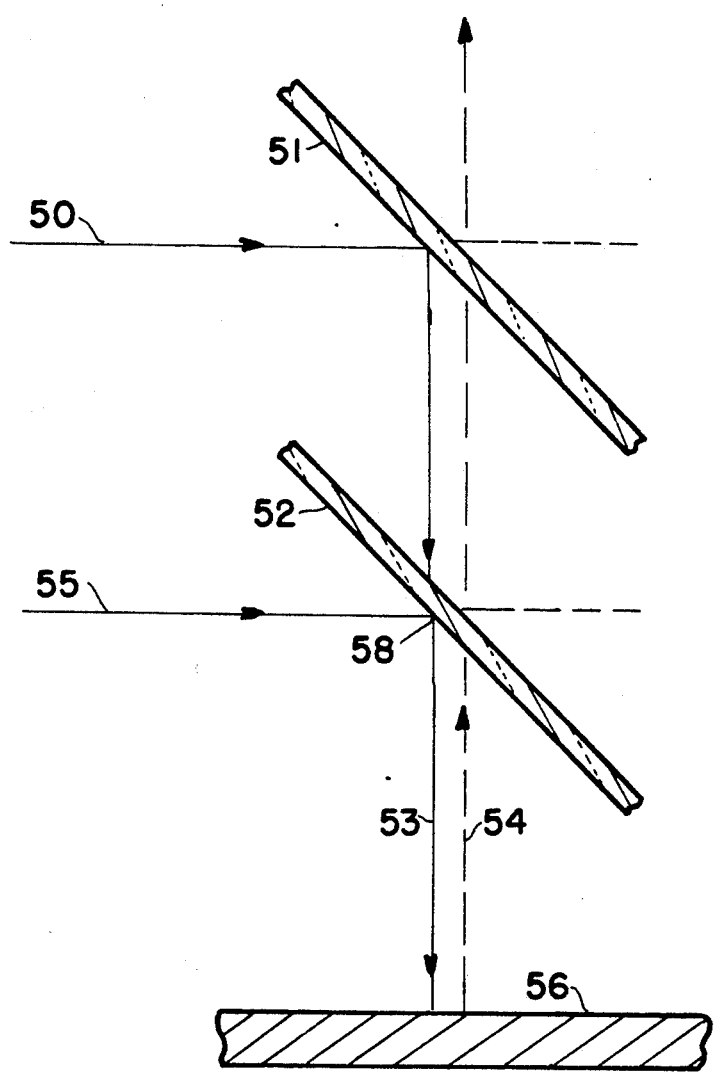
FIG. 4 is a schematic view illustrating the stacking of thin, uncoated beam splitters for generating a wideband output beam by merging input beams in differing bands of the spectrum.

FIG. 1 illustrates a small section of a prior art beam splitter which may be formed of a plate 10 of transparent fused silica approximately one millimeter in thickness. One surface of the plate 10 is coated by well known techniques with an antireflecting material 12 and a multilayer dielectric partially-reflecting coating 14 is applied to the opposite surface. A narrow optical beam 16 in the visible range is applied at a 45° angle to the plate 10 and the surface having the partially-reflecting coating 14 so that a portion of the beam, depending upon the coating thickness, is reflected from the surface as beam 18. The remaining portion of the incident beam 16 is transmitted through plate 10 and through the anti-reflecting material 12 to form an exit beam 20 that is parallel with the incident beam 16 but offset by an amount that depends upon the thickness of plate 10 and its index of refraction.

As previously discussed, antireflecting and partially-reflecting coatings on a transparent plate are substantially opaque to deep ultraviolet radiation. Merely eliminating the coatings from a transparent plate will not produce a practical beam splitter. A small section of a typical 1 mm. thick transparent plate 22 is illustrated without coatings in FIG. 2. A narrow input or incident beam 24 that may be in the ultraviolet range is applied at a 45° angle to one surface of the plate and, as in FIG. 1, a portion of beam is reflected from the surface as reflected beam 26. The remainder of the incident beam 24 passes through the plate 22 and another portion is reflected from the opposite surface as a second reflected beam 28 while the balance is transmitted out as an exit beam 30 parallel with the incident beam 24 but offset by an amount depending upon the thickness of the plate and its index of refraction. If the plate thickness is one millimeter and if we assume an index of refraction of about 1.5, then the separation 32 between the first and second reflected beams 26 and 28 will be about 0.66 millimeters, clearly two separate beams that cannot be focused into one beam and which have too much separation for most accurate applications.

A portion of the beam splitter of the invention is illustrated in FIG. 3 and includes a very thin plate 34 of transparent material having two plane parallel uncoated surfaces 42, 44. The plate 34 may be formed of any transparent material, such as sapphire or fused silica, that is transparent to ultraviolet radiation and is less than 0.15 millimeters in thickness. A thickness of 0.10 millimeters is preferable; thinner plates would be better but not structurably practical. Therefore, an input or incident beam 36 impinging the plate 34 at an angle of substantially 45° will produce, in addition to a parallel exit beam 46, double reflected beams 38, 40 from the front and rear surfaces 42, 44 of the plate that are extremely close together and are practically a single beam. If the thickness of the plate 34 is 0.1 millimeter and its index of refraction is about 1.5 as in the example of FIG. 2, then the separation of the reflected beams 38, 40 will be only about 0.07 millimeters.

It will be appreciated that the absence of either antireflecting or non-reflecting coatings on the surfaces of the wide band beam splitter eliminates absorption of beam energy and greatly improves beam splitter transmission and reflection characteristics. Thus, the energy from a small point source, such as a deuterium discharge tube, with a 0.5–1.0 mm. diameter aperture can obtain nearly twice the reflected energy from a wide band beam splitter compared with a prior art beam splitter.

Due to the high transmission characteristics of the wide band beam splitter, two or more of such splitters can be stacked together without degrading the energy throughput. FIG. 4 illustrates the parallel stacking of two wide band beam splitters 51, 52 so that input beam 50, which may be in the ultraviolet range, can be merged without mechanical switching with a second input beam 55, which may be in the visible range, to form a wideband beam 53. The beam splitters 51, 52 are mounted parallel with each other and at an angle of preferably 45° to the input beams 50, 55 and are positioned so that the beam reflected from beam splitter 51 will precisely align with the beam reflected from beam splitter 52 at the point of incidence 58 of the beam 55. If desired the combined beam 53 may then be used to produce a reflected beam 54 from a reflecting surface 56. While only two beam splitters 51, 52 are shown in FIG. 4, it is apparent that several may be stacked for combining several optical bands into an output beam having various and complex characteristics.

Because of the low reflectivity of each surface of the beam splitter, a reflected image is free of ghosts and even when two or more beam splitters are stacked on each other, the image quality is maintained.

I claim:

1. A wide bank beam splitter for use with impinging radiations of between deep ultraviolet of 190 nanometers and infrared of 900 nanometers, said beam splitter comprising a transparent material having parallel uncoated surfaces and a thickness of less than 0.15 mm.

2. The wide band beam splitter claimed in claim 1 wherein said transparent material is fused silica.

3. The wide band beam splitter claimed in claim 1 wherein said transparent material is sapphire.

4. Optical apparatus for merging a plurality of optical input beams ranging between the deep ultraviolet of 190 nm. to infrared of 900 nm. into one output beam having all characteristics of said input beams, said apparatus comprising:

a plurality of wide band beam splitters positioned parallel with each other, each of said plurality of beam splitters located so that an input beam reflected from its surface will align at the point of incidence of an input beam on the next adjacent beam splitter;

each of said wide band beam splitters comprising a transparent material having parallel uncoated surfaces and a thickness of less than 0.15 millimeters.

5. A method for producing an optical beam splitter for operation in the optical range between deep ultraviolet of approximately 190 nanometers and into the infrared, of approximately 900 nanometers said method comprising the step of:

providing a transparent material with parallel uncoated surfaces and a thickness less than 0.15 millimeters; and positioning said transparent material in the path and at an angle to an optical beam.

6. A method for merging together a plurality of parallel optical beams each ranging between deep ultraviolet of 190 nm. and into the infrared of 900 nm. into an output beam having all frequency characteristics of said plurality of optical beams, said method comprising the steps of:

obtaining a plurality of wide band beam splitters each comprising a transparent material having uncoated parallel surfaces and a thickness of less than 0.15 millimeters;

positioning a plurality of said wide band beam splitters in a stack parallel with each other;

adjusting each of said beam splitters so that one of said parallel optical beams reflected from its surface will strike the point of incidence of another one of said optical beams on the next adjacent beam splitter;

the beam finally emanating from said beam splitter stack having all optical frequencies contained in said plurality of parallel optical beams.

* * * * *